Patented Aug. 25, 1925.

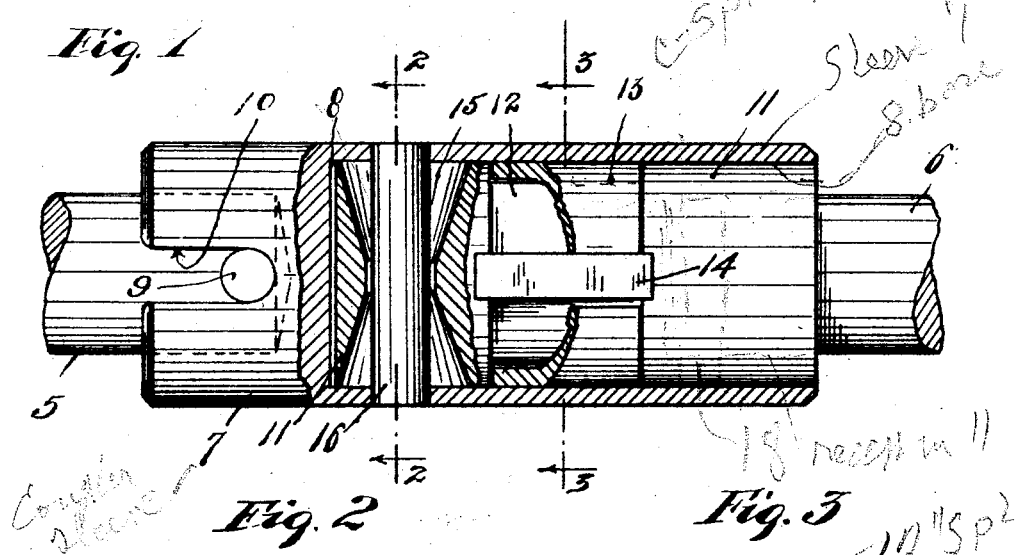
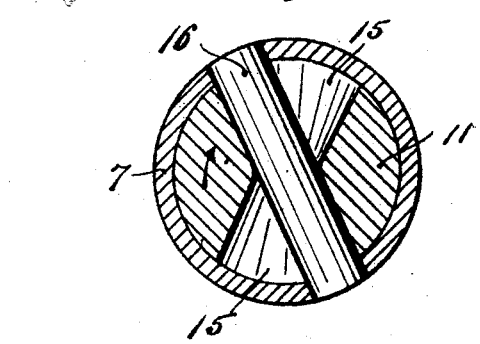
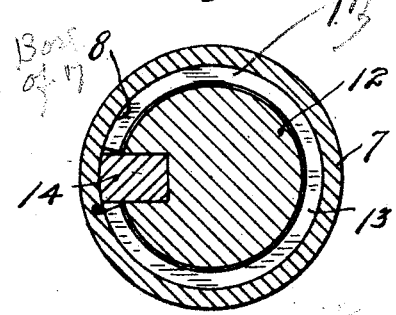
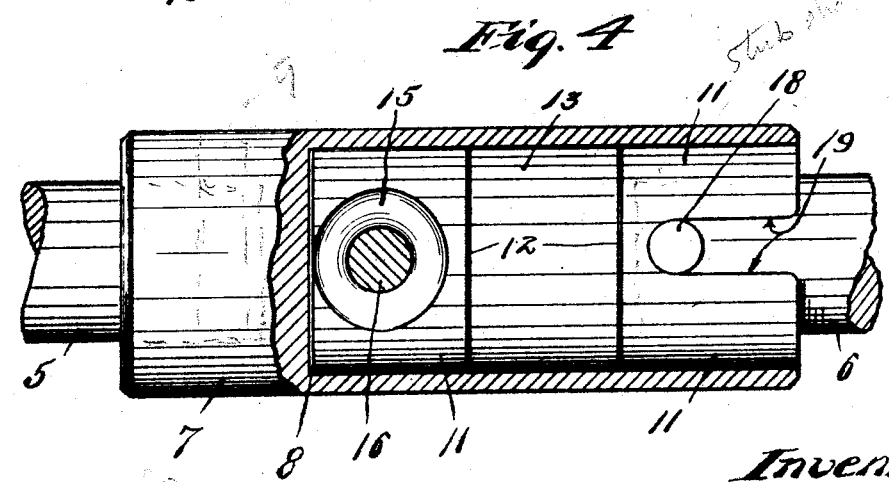
Aug. 25, 1925.     F. W. CARPENTER     1,550,779
FRICTIONAL SLACK MOTION SHAFT COUPLING
Filed May 14, 1924

1,550,779

UNITED STATES PATENT OFFICE.

FRANCIS W. CARPENTER, OF ST. PAUL, MINNESOTA.

FRICTIONAL SLACK-MOTION SHAFT COUPLING.

Application filed May 14, 1924. Serial No. 713,360.

*To all whom it may concern:*

Be it known that I, FRANCIS W. CARPENTER, a citizen of the United States, residing at St. Paul, in the county of Ramsey and State of Minnesota, have invented certain new and useful Improvements in Frictional Slack-Motion Shaft Couplings; and I do hereby declare the following to be a full, clear, an exact description of the invention, such as will enable others skilled in the art to which it appertains to make and use the same.

My invention provides an extremely simple and highly efficient positive drive frictional slack motion coupling for connecting shafts and the like, and, generally stated, the invention consists of the novel construction, combinations and arrangements of parts hereinafter described and defined in the claims.

A device of this kind is intended for use in the driving connections to washing machines and the like, wherein the drums are alternately rotated, first in the one direction and then in the other, through a motion-reversing device. Drums thus rotated acquire considerable momentum and tend to produce shocks in the transmission mechanism when their direction of rotation is suddenly reversed. My improved coupling is especially adapted for the above indicated use, because it will permit slippage and thereby absorb the shocks due to reversal in direction of the drum, and after the shocks have been absorbed, will operate positively to rotate the drum.

In the accompanying drawings, which illustrate the invention, like characters indicate like parts throughout the several views.

Referring to the drawings:

Fig. 1 is a view partly in plan and partly in axial section, showing the improved coupling;

Fig. 2 is a transverse section on the line 2—2 of Fig. 1;

Fig. 3 is a transverse section on the line 3—3 of Fig. 1; and

Fig. 4 shows the coupling partly in elevation and partly in axial section.

The numerals 5 and 6 indicate two axially aligned shafts that are coupled by the improved coupler and which coupler, in its commercial form, comprises as follows:

The numeral 7 indicates a coupler sleeve having a large main bore 8 that extends more than halfway through the same, and provided at its other end with a recess into which the shaft 5 is telescoped. As shown, the shaft 5 has a diametrically projecting pin 9 that engages axially extended notches 10 in the sleeve 7 and thereby adapts the sleeve to be telescoped axially off from said shaft.

The numeral 11 indicates a stub shaft that is telescoped into the large bore 8 of the sleeve 7 and quite closely fits the same. This stub shaft, at its intermediate portion, is reduced at 12 and is there provided with a quite heavy split spring ring 13, which, under its own tension, is sprung into tight frictional contact with the interior of the sleeve but is caused to rotate with said stub shaft by a key 14, the ends of which are tightly seated in said stub shaft. Near its inner end, the stub shaft is formed with a diametrical pin passage 15 that has a reverse conical flare in both directions from the axis of the shaft. A driving pin 16 is tightly driven through diametrically opposite seats in the sleeve 7 and is passed through the reversely conical pin passage 15. The shaft 6, as shown, is telescoped into a seat formed in the outer end of the stub shaft 11 and is connected to positively rotate therewith by a pin 18 driven diametrically through the passage in said shaft 6 and engaged with axial notches 19 in the end of said stub shaft, so that the shaft 6 is adapted to be disconnected from the stub shaft and connected thereto by axial movements.

It may be assumed that the shaft 5 is the extended shaft of the reversible drum of a washing machine, and that the shaft 6 is arranged to be alternately driven, say, four or five revolutions first in the one direction and then four or five revolutions in the opposite direction, said actions being alternated.

With the above arrangement, it is evident that when the shaft 6, for example, is positively rotated in a clockwise direction in respect to Fig. 2, the driving pin 16 will engage the conical walls of the pin passage 15, as shown in Fig. 2, and the shaft 5 will then be positively driven in the same direction and, of course, at the same speed. When the shaft 6 is then reversed and driven in a counterclockwise direction, the shaft 5 and the drum will tend to continue their rotation in a clockwise direction, but such continued rotation will be checked by the frictional contact between the spring friction ring 13 and the sleeve 7, and about the time this shock is absorbed, the driving pin 16 will be engaged with the opposite walls of the reversely conical pin passage 15, and then, of course, the two shafts 5 and 6 will be again temporarily connected for positive and simultaneous rotation in the same direction. This affords a very simple and efficient means, first for cushioning the shock incident to sudden reversal of the driving mechanism, and second, for positively connecting the two shafts for simultaneous and synchronous rotation.

It is important to note that inasmuch as the split ring 13 is normally under spring tension, that is, is normally contracted, and has frictional contact with the surrounding wall of the sleeve 7, that it affords a normally set friction device. This normally set friction device is always ready to exert a friction to resist movements of the sleeve in respect to the shaft and hence under initial movements of the shaft in respect to the sleeve or vice versa, instantly following reversed movements of the driving member, said friction device will retard and assist in the reversal of the driven member so that very little if any check will be produced by the final driving connections which come into action when the limited play has been taken up.

The tapered pin passage 15 is preferably made reversely conical, for the reason that it can be readily bored and reamed to such reverse conical form. However, it is the reverse taper of the said pin passage in the plane of cross section 2—2, which is at right angles to the axis of the shaft and coupling, that gives the above described slip or loss motion followed by a positive driving action.

The above coupling has been put into actual commercial use in connection with washing machines having reversible drums, and has been found entirely satisfactory and very highly efficient for the purposes had in view.

What I claim is:

1. A shaft coupling comprising a sleeve having a bore, a shaft telescoped into the bore of said sleeve, a normally set frictional rotation-resisting device interposed between said shaft and sleeve, and means permitting a limited slack rotary motion of said shaft in respect to said sleeve, but causing the two to rotate together at the limits of said slack rotary motion.

2. A shaft coupling comprising a sleeve having a bore, a stub shaft telescoped into the bore of said sleeve, an expansible split spring ring rotatable with said stub shaft and normally set in frictional engagement with the interior of said sleeve, said stub shaft having a reversely tapered pin passage, and said sleeve having a driving pin extended diametrically therethrough and through said reversely tapered pin passage and serving to permit limited slack motion of said stub shaft in respect to said sleeve but causing said stub shaft and sleeve to rotate together at the limits of such slack motion.

3. The structure defined in claim 2 in which the reversely tapered pin passage in said stub shaft is reversely conical.

In testimony whereof I affix my signature.

FRANCIS W. CARPENTER.